June 9, 1931  S. NELSON  1,808,903

ANIMAL TRAP

Filed Aug. 21, 1930

SVEN NELSON
INVENTOR

PER *Gust Hjelm*

ATTORNEY

Patented June 9, 1931

1,808,903

UNITED STATES PATENT OFFICE

SVEN NELSON, OF HORNEPAYNE, ONTARIO, CANADA

ANIMAL TRAP

Application filed August 21, 1930, Serial No. 476,931, and in Canada August 26, 1929.

This invention relates to improvements in animal traps and has for one of its principal objects the provision of a readily portable and easily operated trap which will be particularly efficient for trapping small animals such as gophers or the like, and which will also be useful for trapping fur bearing animals without in any way damaging the skins.

One of the important objects of this invention is to provide in an animal trap means for placing the same in such relation to the hole or place of abode of the animal that it will be practically impossible for said animal to emerge or escape from said hole without becoming entangled in the trap.

Another and still further important object of the invention is to provide an animal trap which is simple and economical of construction, readily operated, and therefore, not likely to get out of order, and which furthermore, dispenses with the use of bait in any form.

Other and further important objects of the invention will be apparent from the disclosures in the accompanying drawings and following specification.

The invention, in a preferred form, is illustrated in the drawings and hereinafter more fully described.

Figure 1:
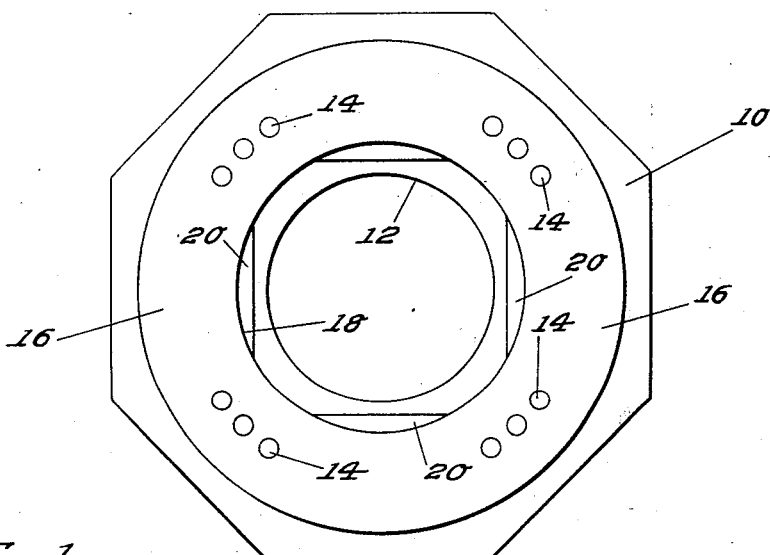
Figure 1 is a top plan view of the improved animal trap of this invention.
Figure 3:
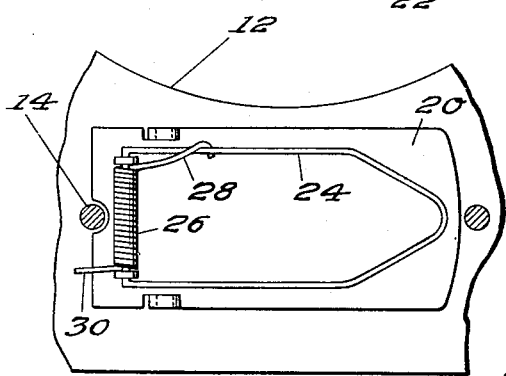
Figure 3 is a detail view of one of the individual traps forming part of the apparatus.

The reference numeral 10 indicates generally the base of the improved animal trap of this invention which is preferably of fairly heavy material and of any desired size and shape according to the size and nature of the animals for which the trap is intended. This metal plate has a circular or other opening 12 cut in the central portion thereof as shown in Figures 1 and 3, the plate itself being adapted to be placed over a hole in the ground or the like which forms the abode of the animals to be trapped, such as gophers, prairie dogs, rats, mice, and even larger and other animals, particularly fur bearing animals and the like.

Mounted on the base 12 and spaced apart from each other at intervals of ninety degrees around the base is a plurality of sets of uprights 14, and these uprights in turn support the top 16 for the trap. This top has preferably an opening 18 formed therein concentric with the opening 12 and desirably of a slightly larger diameter, the outer diameter of the top being slightly less than the corresponding outside dimension of the base. It will be noted, however, that the inner edge of the opening 18 overhangs the upright 14 to a considerable extent so that it is practically impossible for an animal to crawl through the upper opening of the trap.

Figure 2:
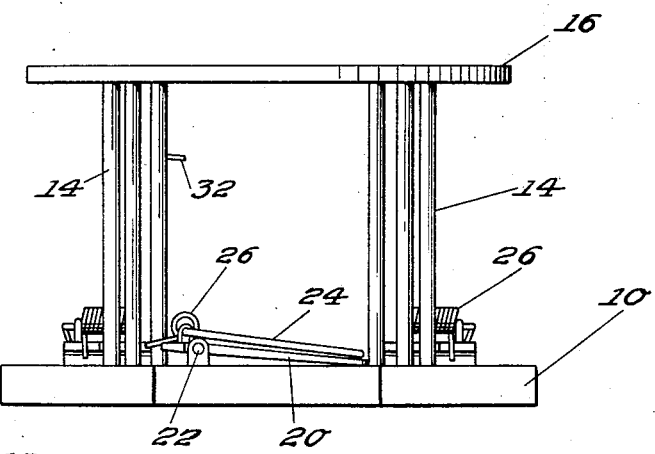
Figure 2 is a side elevation thereof.

The space between each set of uprights 14 is filled by the platform 20 pivotally mounted at 22, the pivotal mounting being slightly above the upper face of the base 12 and the rear edge of the platform extending slightly beyond the pivotal point as best shown in Figure 2.

Mounted upon each platform 20 is a jaw in the form of a piece of metal or strong wire shaped as shown at 24 in the figures. This jaw is pivoted inside a helical spring 26, one end of which spring is extended outwardly and curved around an arm of the jaw as shown at 28, the other end of the spring being forced behind the rear edge of the platform 20 as shown at 30.

When the jaw element 24 is raised upwardly, the spring 26 is placed under tension in an obvious manner and the outer lip of the jaw element is then hooked over a suitable projection 32 fastened to one of the uprights 14 as best shown in Figure 2. This can be readily accomplished by depressing the front edge of the platform 20 slightly whereby the rear edge is raised sufficiently to allow the lip of the jaw 24 to be placed in position over the projection 32.

Obviously, as soon as an animal steps upon any of the platforms 20 in attempting to make its way out of the trap through the space between the uprights 14, the jaw 24 will be released on account of the upward motion of the rear end of the platform and the spring will force the jaw downward trapping the animal.

The trap itself can be made of any size or shape as desired, and of a sufficient weight to be retained in any position where it is placed. In order to make sure of trapping the animals additional exits to their holes may be covered by other traps or blocked by stones.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. An animal trap including a base having an opening for the passage of animals upwardly therethrough, and spring traps spaced about the said opening, said spring traps comprising platforms and spring-operated jaws pivotally mounted on the platforms, said platforms being themselves pivotally mounted on the base and comprising release elements for the spring jaws upon depression of the platforms.

2. An animal trap including a base having an opening for the passage of animals upwardly therethrough, and spring traps spaced about the said opening alternately with means prohibiting the passage of animals except over the traps, said means comprising uprights, said traps comprising platforms pivotally mounted on the base and spring jaws pivotally mounted on the platforms, and means on the uprights for retaining the spring jaws in set position.

3. An animal trap including a base having an opening for the passage of animals upwardly therethrough, and spring traps spaced about the said opening alternately with means prohibiting the passage of animals except over the traps, said means comprising uprights, said traps comprising platforms pivotally mounted on the base and spring jaws pivotally mounted on the platforms, and means on the uprights for retaining the spring jaws in set position, said means comprising extensions from which the spring jaws are released upon depression of the forward end of the pivoted platforms.

In testimony whereof I affix my signature.

SVEN NELSON.